United States Patent [19]

Hill et al.

[11] 4,096,450
[45] Jun. 20, 1978

[54] CONDUCTIVELY COOLED FLASHLAMP

[75] Inventors: Lowell W. Hill, Playa del Rey; Robert L. Cassiero, Mar Vista; Peter F. Taylor, Agoura; Harold J. Tuchyner, Pacific Palisades, all of Calif.

[73] Assignee: Hughes Aircraft Company, Culver City, Calif.

[21] Appl. No.: 789,894

[22] Filed: Apr. 22, 1977

[51] Int. Cl.² ............................................. H01S 3/09
[52] U.S. Cl. .............................. 331/94.5 P; 313/46; 331/94.5 D; 29/25.11
[58] Field of Search .................. 313/46; 331/94.5 D, 331/94.5 P; 29/25.11

[56] References Cited

U.S. PATENT DOCUMENTS 3,582,822 6/1971 Karney ............................. 313/46 X Primary Examiner—Rudolph V. Rolinec
Assistant Examiner—Darwin R. Hostetter
Attorney, Agent, or Firm—Martin E. Gerry; W. H. MacAllister

[57] ABSTRACT

An improved laser cooling system for high repetition rate lasers in which a flashlamp is cooled by conducting the heat generated in the lamp directly to a holder which is a solid thermal conductor formed by the structure of the pump cavity and in turn to a heat sink without using flowing gas or liquid in the cavity or space surrounding the flashlamp. The flashlamp is fixedly mounted on the holder with a gap or space therebetween. A thin layer of barium sulfate powder or any other suitable material (which can physically conform to the outside surface of the flashlamp envelope while providing adequate thermal conductivity between the flashlamp and the holder, and adequate optical reflectivity) is then packed in the gap between the flashlamp envelope and the holder in order to reflect light efficiently and to provide a good thermal contact between the holder and the flashlamp. Using the powder in this fashion tolerates any irregularities in standard flashlamp surfaces and housing surfaces that are caused in their production and so allows use of any suitable flashlamp and housing. This flashlamp cooling system is more compact and cheaper to make than existing systems, and allows easier replacement of the flashlamp.

14 Claims, 3 Drawing Figures

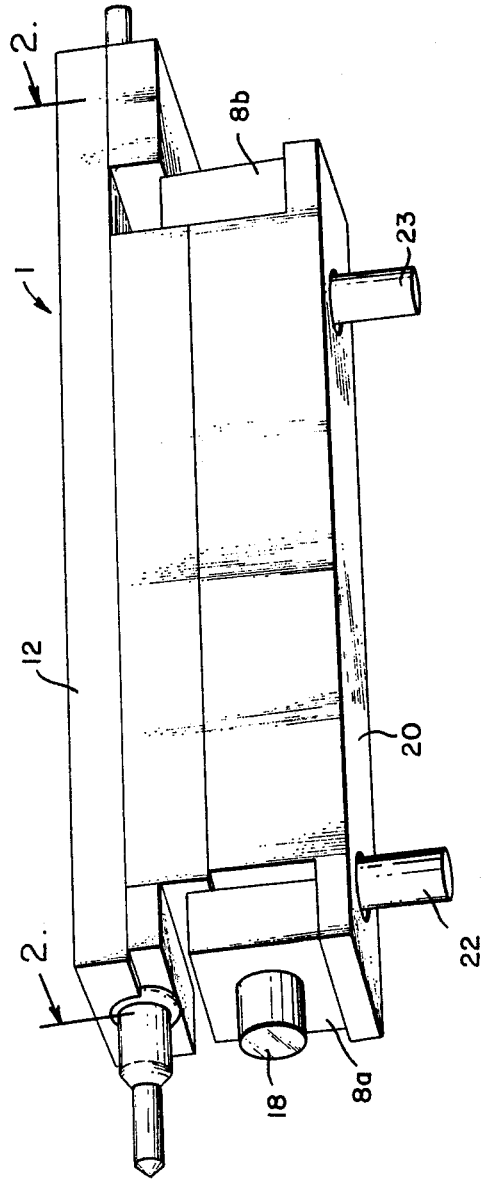
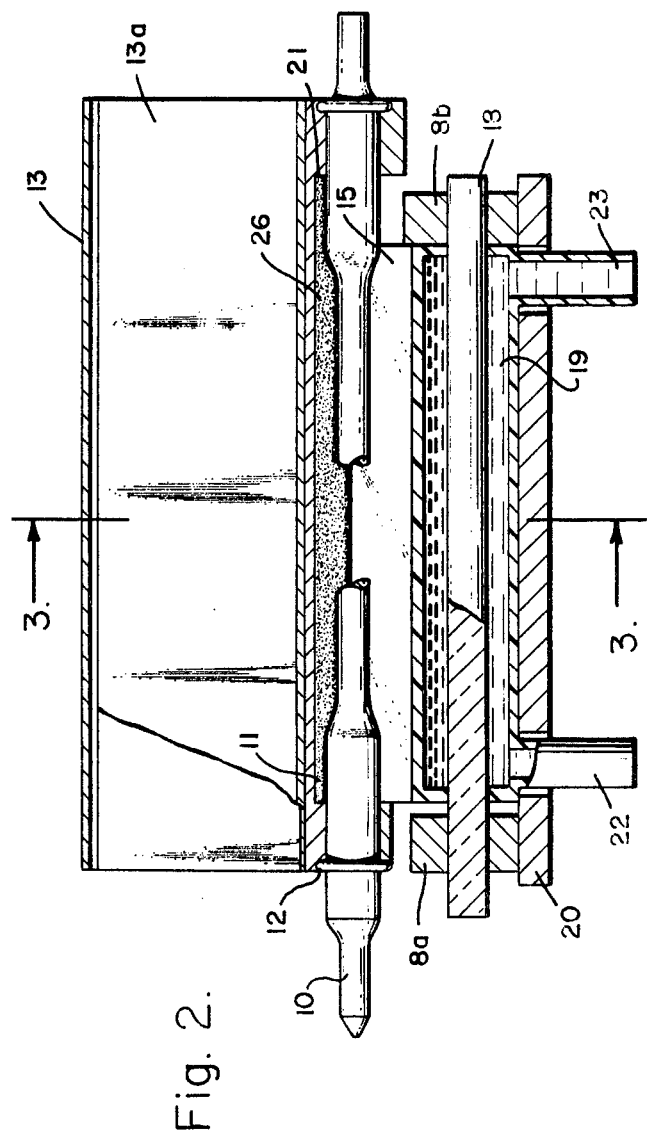
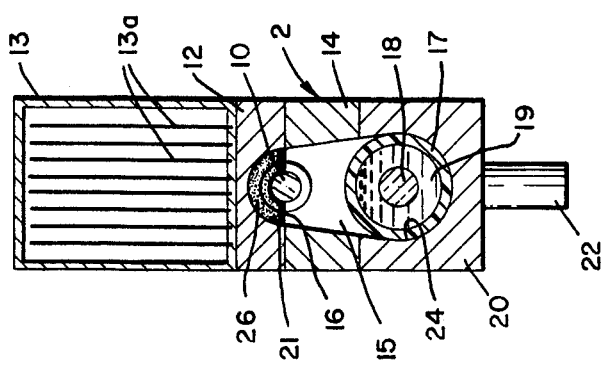
Fig. 1.
Fig. 2.
Fig. 3.

CONDUCTIVELY COOLED FLASHLAMP

BACKGROUND OF THE INVENTION

1. Field of the Invention

This invention relates to lasers and particularly to a laser having an improved flashlamp cooling arrangement.

2. Description of the Prior Art

In order to produce laser action in an active laser, a certain minimum pump energy is required per unit volume of laser material above the minimum rate in order to sufficiently overcome spontaneous decay. The energy not utilized in excitation of the laser material takes the form of heat which, if not removed from the area surrounding the material, will cause deterioration of the laser action and flash lamp. In attempting to overcome the problem of heat buildup, several flashlamp cooling methods have been employed. Various techniques have been utilized such as using forced circulation of high pressure nitrogen or air and liquid cooling, for cooling both the flash lamp and laser material in one system. These methods are efficient but relatively cumbersome and expensive. The liquid system has limited coolant life, and tends to be relatively complex and inconvenient with regard to problems associated during flashlamp replacement. In addition, both the pressurized gas and liquid systems are usually designed so that the coolant path of the flashlamp and laser material are in series in order to prelude even greater bulkyness and complexity. This in turn requires that the overall series cooling system be designed to accommodate the relatively large heat load of the flashlamp, which can operate successfully at relatively high temperatures, with the relatively small allowable temperature rise of the laser material, which in turn introduces a relatively small amount of waste heat into the cooling system.

Other approaches that have been used to attempt to solve the problem of heat buildup has been the design of a new laser pump cavity configuration. The theory is that if substantial portions of the optical pump energy can be directed on the active laser element which has been made in the form of a rod, less pump energy will be wasted in the form of heating the pump cavity. An elliptical pump cavity configuration is one example of this, where the flash lamp is placed along one of the focal lines of the elliptical cylinder and the active laser element in the form of a rod which lies along the other focal line. This configuration provides good optical characteristics, but results in a large air space between the laser rod or the flashlamp and the cavity inner wall. When the laser is operated at a higher repetition rate, the laser element and the flashlamp become extremely hot and soon stop lasing due to the poor thermal path conducting the heat away from the laser rod and the flashlamp. Another example of this type of approach is placing of the flashlamp and the lasing rod in close proximity to each other surrounded by materials such as aluminum foil or magnesium oxide. The effect is not as efficient as the elliptical cavity. It does not supply an adequate heat sink and resulted in a high heat buildup in the laser rod and flashlamp.

Another method to overcome the heat problem is the Griest cavity shown in U.S. Pat. No. 3,475,697, and incorporating a semi-elliptical pump cavity. This arrangement focuses pump energy from a linear flashlamp on a laser rod that is in thermal contact with the heat sink. This method conducts heat well enough for low repetition rates but has been found to have a heat buildup for some lasers operating at very high repetition rates.

SUMMARY OF THE INVENTION

The improved laser system for high repetition rate lasers in accordance with the invention incorporates a separate cooling means for the flashlamp and the lasing material. The high pumping efficiency of the flashlamp is obtained through the utilization of a packed powder disposed in one end of the pump cavity in a gap between the outer surface of the flashlamp and the same surface of the pump cavity. The packed powder has certain characteristics which make it very suitable for heat transfer. For example, the powder has an intermediate thermal conductivity which allows the intense heat developed by the flashlamp to be conducted away from the flashlamp through the powder to the aforementioned surface of the pump cavity. It also has the optical characteristic of a high diffuse reflectivity while withstanding vibration, high operative temperatures and ultraviolet light. Since the heat generated in the flashlamp may be 60-70% of the total heat load within the pump cavity, it may be removed by its own cooling system. By separating the cooling systems for the flashlamp and the laser rod, a more compact and efficient laser is created. The arrangement of the invention fulfills the function of an efficient laser by positioning the laser elements as close together as possible while allowing heat to be removed efficiently. The concept of the invention reduces the package size of the laser and cools the laser rod and the flashlamp in separate systems quickly and efficiently without creating optical distortion.

It is thus an object of the invention to provide a laser having an optimal flashlamp cooling system.

It is another object of the invention to provide a laser that maintains high optical pumping efficiency while maintaining good heat transfer.

It is still another object of the invention to provide a laser which is compact yet maintains high optical quality and good control of the heat generated by the flashlamp.

It is a further object of the invention to provide a relatively inexpensive flashlamp and laser material cooling arrangement while maintaining high conductive thermal control.

It is also an object of the invention to provide a laser that allows easy replacement of the flashlamp without disturbing the remainder of the laser arrangement or the laser material cooling system.

BRIEF DESCRIPTION OF THE DRAWINGS

The invention will be best understood from the accompanying description taken in connection with accompanying drawings in which like reference characters refer to like parts and in which:

FIG. 1 is a perspective view of a laser constructed according to the invention;

FIG. 2 is a sectional view taken at lines 2—2 along the vertical length of the embodiment shown in FIG. 1 showing the inside of the laser; and FIG. 3 is a cross-sectional view taken at lines 3—3 of FIG. 2 for further explaining the positioning of the laser pump cavity.

DETAILED DESCRIPTION OF THE PREFERRED EMBODIMENTS

Referring first to FIG. 1, there is shown the perspective outer view of a laser 1 in accordance with the invention. The laser 1 includes a housing means 2 which contains a flashlamp 10 and a laser rod 18. The housing means 2 is formed of separable structures 12, 14 and 20. Also shown are tubes 22 and 23 which are used respectively as an entrance and exit means for a cooling fluid 19 (FIG. 3).

Referring now to FIGS. 2 and 3, there is shown a laser pumping cavity or chamber 15 defined by surfaces such as 21 and 24. The cavity 15 may have any configuration suitable for laser operation such as having circular or elliptical shapes at said surface 21 and at the lower surface. Pumping chamber 15 is contained in the multipart housing 2 consisting of the portions 12, 14 and 20 which can be made from any suitable material that can provide a cavity structure for a laser, preferably a metal of good thermal conductivity such as aluminum. Mounted within the lower portion of the chamber 15 is a laser rod 18 which may be of a laser material such as ruby, Nd:Yag or any suitable solid-state laser material, or which may be any suitable lasing structure such as a dye container. The laser rod 18 is mounted with chamber 15 with its ends supported by respective extensions 8a and 8b which are adjacent to opposite ends of the housing wall 20. The flashlamp 10 is disposed in lateral proximity to the laser rod 18 so as to enable pumping of rod 18 to a lasing state.

In order to remove heat generated around the laser rod 18 by the flashlamp 10, an arrangement is provided for circulating a high pressure coolant gas or a liquid 19 past the laser rod 18. The coolant gas or liquid 19 may be admitted through the tube 22 to the area surrounding the laser rod 18 in an annular space formed between the outer surface of the laser rod 18 and the inner surface of a transparent tubing such as pyrex tubing 17 and transferred therefrom through tube 22. It is to be noted that this laser cooling system is kept separate from the flashlamp cooling system by means of the pyrex tubing 17.

The heat created by the flashlamp 10 is removed from the immediate area surrounding the flashlamp 10 by use of a packed powder 11 positioned in a gap or space 26 formed by the elongated surface of the flashlamp 10 and the elongated channel formed by the surface 21. The packed powder 11 may be any suitable material such as BaSc$_4$, alumina, beryllia or a ceramic material or any other powder material having suitable characteristics.

The surface 21 which is a holder for the flashlamp 10 may be a machined surface, for example, and may have irregularities on the surface and still provide optimum heat transfer from the flashlamp through the packed powder because the irregular surfaces are filled by the packed powder 11. In a similar manner, the arrangement of the invention using a packed powder allows use of a flashlamp 10 that may have an irregular or imperfect surface while providing a high degree of heat transfer from the flashlamp 10.

The packed powder 11 has the characteristic of an intermediately high thermal conductivity, for example, which allows the heat developed by the flashlamp 10 to be conducted from it to the elongated channel 21 and to the containment mean 12. The packed powder 11 may also have the characteristics of high diffuse reflectivity, being able to withstand ultraviolet light, and also withstand the high temperatures created by the flashlamp, to optimize the operation of the arrangement. Another arrangement in accordance with the invention is to utilize a clear or translucent powder as the packed powder 11 with the surface 21 having a highly reflective coating such as gold. Barium sulfate has been previously used for its spectral reflectivity characteristic in connection with pump cavities as taught in U.S. Pat. No. 4,005,333 by Nichols and U.S. Pat. No. 3,979,696 by William W. Buchman but these patents do not teach placing a powder in the pump cavity in accordance with the invention. These references do not teach taking advantage of properties of a powder such as the diffuse reflectivity characteristic, the capability to be a thermal conductor, the mechanical characteristic of filling the gap created by the flashlamp and the cavity wall and being able to withstand the high temperature created by the flashlamp. Also in the laser cavities of the above-referenced patents, barium sulfate was used because it withstood ultraviolet light but only after filtering by the samarium glass. In the system of the invention the barium sulfate has been found to be capable of withstanding exposure to unfiltered ultraviolet light.

Attached to the housing structure portion 12 is a structure 13 that may be either a heat exchanger or any suitable heat sink. In the illustrated arrangement, structure 13 includes fins which conduct heat by convection to an ambient coolant such as air which flows past the fins by means of a blower or fan.

Other varieties of heat exchangers that may be utilized in accordance with the principles of the invention to remove the heat conducted through the packed powder 11 are those that utilize water, beeswax, or other change of phase material for a limited duty cycle, or natural convention. Also, other methods of heat exchange that may be utilized are attaching housing structure 12 to a cold plate heat exchanger such as a piece of metal with holes and in which liquid or gas is passed through to absorb heat, or by direct attachment of another metal to portion 12 and allowing the attachment to absorb heat.

The method of forming the flashlamp cooling system (not shown) in the elongated channel surface 21 of the pump cavity 15 is to place portion 15 on a table then to fixedly mount flashlamp 10 in the channel created by surface 21 in a position such as to create the gap 26 between flashlamp 10 and surface 21. The next step is packing the powder 11, using a plastic spatula, in the gap 26 created by flashlamp 10 and surface 21. A paste 16 is made from a material that has the characteristics of withstanding a high temperature without breaking down under exposure to ultraviolet light emitted by the flashlamp such as 6091 Eastman Kodak white reflective standard, and painting the paste 16 thinly on at least one portion of the edges of packed powder 11. After this paste dries it maintains the powder 11 in position.

An arrangement, in accordance with the principles of the invention, has been successfully tested in the laboratory in several experimental setups utilizing Nd:Yag as the laser material. Efficiency, thermal dissipation capbility and lifetime have been measured. Efficiency is at approximately 1.5% which is comparable to current efficient Nd:Yag lasers that utilize conventional heat exchange methods. Lasers using the conductively cooled flashlamp have been successfully operated at 250 watts input (8.3 joules at 30 hz) continuously for 2 hours, and to much higher inputs, 600 watts, (6 joules at 100 hz) for 1 minute intervals. Conductively cooled flashlamps have been life tested for 10 million shots with less than 10% degradation in laser efficiency. Conductively cooled flashlamps have been vibration tested and thermally cycled, with no deleterious effects.

The packed powder 11 is selected to have a sufficiently high thermal conductivity so as to remove the heat created by the flashlamp.

The thermal conductivity of packed barium sulfate powder has been measured and found to be in the range of $0.96 \times 10^{-3}$ to $1.32 \times 10^{-3}$ watts/cm-°C.

Thus, there has been described a laser with an improved heat exchanger arrangement that utilizes a packed powder in the elongated space or gap between the flashlamp and an edge surface of the cavity so that the volume in the elongated space is filled with the powder for improved heat transfer. The powder is selected with a sufficient heat transfer coefficient to conduct the heat from the flashlamp which may operate at a high repetition rate. The powder which for example may be barium sulfate is selected with other suitable characteristics such as diffuse reflectivity and the ability to withstand high temperatures. For some arrangements, in accordance with the invention, the powder may be selected to be translucent to allow the light to be reflected from the cavity surface. The arrangements, in accordance with the invention, allows a separate and simplified heat exchanger to be utilized for the flashlamp cooling. This invention allows each component to be more optimally cooled since the flashlamp and laser material are not cooled in series. The cooling, in accordance with this invention, is accomplished within a smaller overall volume than with the gas and liquid systems, which also permits more freedom in positioning the flashlamp and laser material relative to each other for greater overall laser efficiency.

What is claimed is:

1. A laser energizing arrangement in a laser pump cavity which is formed by a housing means, said pump cavity having an elongated channel comprising:
   a flashlamp positioned within said channel, and
   a packed powder positioned between the flashlamp and said elongated channel, the packed powder having thermal conductivity characteristics which allow the heat developed by the flashlamp to be conducted from the flashlamp through the elongated channel to said housing means.

2. The combination of claim 1 in which said packed powder is selected to have the characteristic of a high diffuse reflectivity.

3. The combination of claim 1 in which said packed powder is selected to have the characteristics of being able to withstand ultraviolet light.

4. The combination of claim 1 in which said packed powder is selected to be translucent and said elongated channel has a highly reflective surface.

5. The combination of claim 1 including a heat exchanger or heat sink for receiving the heat at high temperatures created by said flashlamp.

6. The combination of claim 1 in which said packed powder is selected from the group consisting substantially of either barium sulfate, alumina or beryllia.

7. The combination of claim 1 in which said packed powder is a ceramic material.

8. A laser comprising:
   housing means including a pump cavity having an elongated channel along one surface portion,
   lasing means positioned in said pump cavity,
   a flashlamp for energizing said lasing means positioned along said channel so as to create a gap between said flashlamp and said surface, and
   a packed powder placed in said gap and having a thermal conductivity characteristic that allows heat developed by said flashlamp to be conducted from the flashlamp to said housing means.

9. The combination of claim 8 in which said packed powder is selected with the characteristics of a high diffuse reflectivity.

10. The combination of claim 8 in which said packed powder is selected to have the characteristics of being able to accommodate differences in the expansion of the said flashlamp and said housing means.

11. The combination of claim 8 in which said packed powder is selected to be translucent and said channel has a highly reflective surface.

12. The combination of claim 8 in which said packed powder is selected from the group consisting substantially of either barium sulfate, alumina or beryllia.

13. A method of forming a flashlamp cooling system in a laser having a housing structure with a pump cavity having an elongated channel machined in at one surface portion of said cavity comprising the steps of:
   a. fixedly mounting said flashlamp in said channel so as to create a gap between said flashlamp and said channel,
   b. packing a powder in said gap created by said flashlamp surface and the housing means, said powder being selected with characteristics of high spectral reflectivity, thermal conductivity that allows heat to be conducted from said flashlamp to said housing means, and the ability to withstand ultraviolet light,
   c. creating a paste from a material that has the characteristics of withstanding high temperature and vibration without breaking down under exposure to ultraviolet light emitted by said flashlamp, and
   d. painting the paste thinly on at least a portion of the edges of the packed powder in order to maintain said packed powder in position.

14. The combination of claim 13 in which said packed powder is barium sulfate.

* * * * *